Patented Mar. 9, 1954

2,671,776

UNITED STATES PATENT OFFICE 2,671,776

TRISAZO-DYESTUFFS

Raymond Gunst, Binningen, Switzerland, assignor to Ciba Limited, Basel, Switzerland, a Swiss firm No Drawing. Application December 10, 1951,
Serial No. 260,930

Claims priority, application Switzerland
January 19, 1951

9 Claims. (Cl. 260—171)

This invention provides new trisazo-dyestuffs which correspond, in the form of their free acids, to the general formula

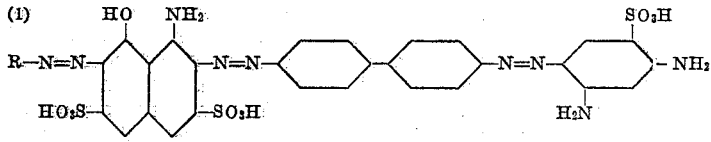

in which R represents an aromatic radical of the benzene series which is preferably sulfonated.

These products can be made by coupling a diazo-azo-compound which, in the form of the free acid, corresponds to the general formula

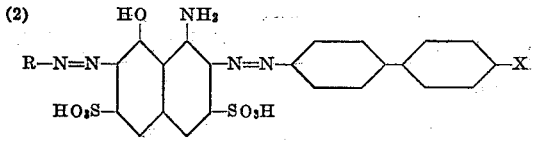

in which R has the meaning given above, and X represents a diazotized amino group, with 1:3-diaminobenzene-4-sulfonic acid.

The diazo-azo-compounds of the Formula (2), certain of which compounds are already known, can be made by coupling tetrazotized 4:4'-diaminodiphenyl in an acid medium on one side with 1-amino-8-hydroxynaphthalene-3:6-disulfonic acid, and coupling the resulting compound in an alkaline medium with a diazo compound of an amine of the constitution R—NH₂, in which R has the meaning given above.

As amines of the formula R—NH₂ there come into consideration, for example, unsulfonated aminobenzenes such as aniline and substitution products thereof such as toluidine, chloraniline, but preferably aniline sulfonic acids such as aniline-2- or -3- or -4-sulfonic acid, 1-amino-2-methoxybenzene-4-sulfonic acid, 1-amino-4-chlorobenzene-2-sulfonic acid, 1-amino-4-nitrobenzene-2-sulfonic acid, and also aniline disulfonic acids such as aniline-3:5- or -2:5-disulfonic acid.

The coupling of the tetrazotized 4:4'-diaminodiphenyl with 1-amino-8-hydroxynaphthalene-3:6-disulfonic acid is carried out in an acid medium, advantageously a mineral acid medium. For coupling the resulting diazo-monoazo-compound with the diazo compound of the amine of the formula R—NH₂ in an alkaline medium there is advantageously used a medium rendered alkaline with an alkali carbonate. The coupling of the diazo-disazo-compound of the Formula (2) with 1:3-diaminobenzene-4-sulfonic acid is advantageously carried out in a neutral to weakly alkaline medium.

The dyestuffs of the invention are new and correspond to the above Formula (1). They are principally suitable for dyeing chrome-tanned leather, especially velour leather (suede).

It is known that dyestuffs suitable for dyeing cellulose fibers of the type of "Direct Deep Black" of the formula

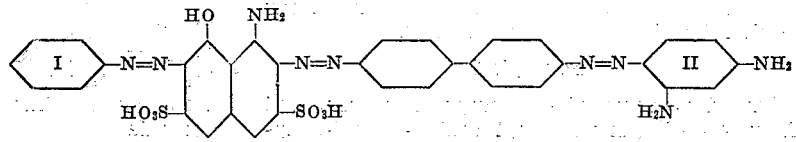

(Colour Index No. 581, see also Schultz Farbstofftabellen, 7th edn. No. 671)

are not especially suitable for dyeing velour leather, since they have a strong tendency to produce bronze effects and, even with strong dyeings, not a deep black tint but a violettish navy blue tint is obtained. For dyeing leather it has been proposed to use dyestuffs which differ from "Direct Deep Black" in that they contain an additional sulfonic acid group in the benzene nucleus I. Although these dyestuffs have substantially less tendency to give bronze effects, they have the disadvantage of yielding dyeings having an even stronger violet shade. In accordance with the present invention by the simple expedient of introducing a further sulfonic acid group into the benzene nucleus II dyestuffs are obtained which, when used for dyeing velour leather, have much less tendency to yield bronze as described in Example 1. A dyestuff of the formula

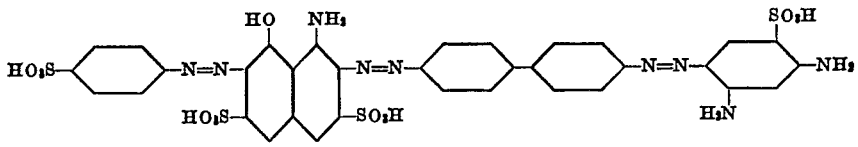

effects than the above-mentioned dyestuffs and yield deep, bluish to greenish black tints, especially desirable on velour leather.

The following examples illustrate the invention, the parts and percentages being by weight:

Example 1

19 parts of 4:4'-diaminodiphenyl are tetrazis obtained having excellent solubility and dyeing velour leather handsome greenish black tints.

Similar dyestuffs of excellent solubility are obtained by using, instead of 1-aminobenzene-4-sulfonic acid, an equivalent quantity of 1-amino-benzene-3:5-disulfonic acid or 1-aminobenzene-2:5-disulfonic acid. In the latter case there is obtained a dyestuff of the formula

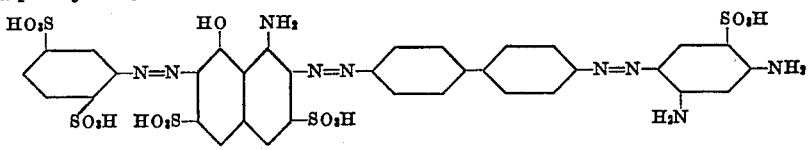

otized in known manner. To the resulting tetrazo-solution is introduced dropwise in the course of 1 hour a clear solution of 34.1 parts of 1-amino-8-hydroxynaphthalene-3:6 - disulfonic acid in 300 parts of water, which solution has a pH value of 5.6. The temperature is 10–15° C. A dilute aqueous solution of sodium carbonate is introduced dropwise to neutralise the mineral acid liberated during coupling, and the mixture is maintained throughout at a distinctly acid reaction to Congo. After 12 hours there is run in at 5° C. a diazonium solution prepared from 8.8 parts of aminobenzene, and a solution of 26 parts of sodium carbonate in 120 parts of water is poured into the coupling mixture while stirring powerfully; the pH value should not be higher

Example 3

The tetrazo compound from 19 parts of 4:4'-diaminodiphenyl is coupled, in the manner described in Example 1, with 34.1 parts of 1-amino-8-hydroxynaphthalene-3:6-disulfonic acid in an acid medium to form the intermediate compound. 20.3 parts of 1-amino-2-methoxybenzene-5-sulfonic acid are diazotized in known manner, and the diazo compound is coupled in a weakly alkaline medium with the aforesaid intermediate compound. After about 10 minutes a solution of 19 parts of 1:3-diaminobenzene-4-sulfonic acid in 100 parts of water is added for the final coupling. After about 2 hours the formation of the dyestuff is complete. It corresponds to the formula

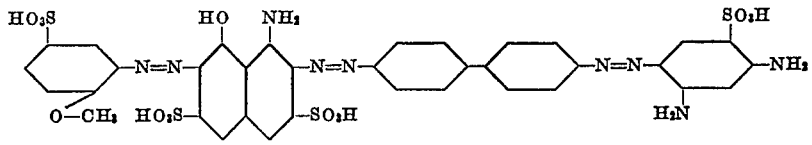

than 8.5. After 30 minutes a solution of 18.8 parts of 1:3-diaminobenzene-4-sulfonic acid is added. After stirring for 2 hours the reaction mixture is rendered weakly acid by the addition of hydrochloric acid and the precipitated dyestuff is separated by filtration and dried. The resulting black powder dissolves easily in water and dyes chrome tanned leather, especially velour leather, handsome bluish black tints.

Example 2

The first intermediate compound is prepared from 4:4'-diaminodiphenyl and 1-amino-8-hydroxynaphthalene-3:6-disulfonic acid in the manner described in Example 1. Instead of the diazonium compound from 8.8 parts of aminobenzene used in that example, a diazonium compound is prepared from 17.3 parts of 1-aminobenzene-4-sulfonic acid and coupled with the aqueous suspension of the first intermediate compound, and then a cold aqueous solution of sodium carbonate is poured into the coupling mixture in a manner analogous to that described in Example 1. The further procedure is exactly The reaction mixture is heated up to 80° C., and the dyestuff is precipitated in a good filtrable form by the addition of hydrochloric acid until the reaction is weakly acid to Congo. When dry it is a dark powder which dissolves in water with a green-black coloration and dyes chrome-tanned leather distinctly greenish-black tints.

A similar dyestuff yielding somewhat more bluish black tints is obtained by using, instead of 1-amino-2-methoxy-5-sulfonic acid, an equivalent quantity of 1-amino-4-chlorobenzene-2-sulfonic acid. This dyestuff corresponds to the formula

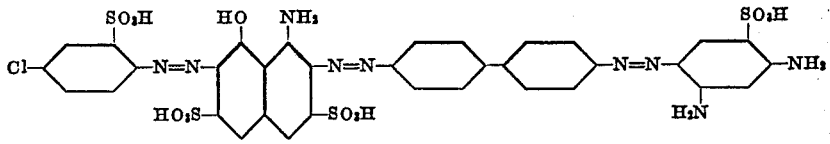

Example 4

The intermediate compound from 4:4'-diamino-diphenyl and 1-amino-8-hydroxynaphthalene-3:6-disulfonic acid is prepared as described in Example 1. The intermediate compound is coupled with the diazo compound, prepared in the usual manner, from 21.8 parts of 1-amino-4-nitrobenzene-2-sulfonic acid, and the pH value of the coupling mixture is adjusted to 8.0 to 8.5 by the addition of sodium carbonate. The coupling is complete in a few minutes. In the manner described in the preceding examples the product is then coupled with 19 parts of 1:3-diaminobenzene-4-sulfonic acid. The dyestuff is precipitated from the hot solution in the form of the dyestuff acid by means of hydrochloric acid, and separated by filtration. It dyes chrome-tanned leather black tints having an olive shade.

*Example 5*

100 parts of well fulled velour leather are introduced into a dye vat with 8 times its weight of water at 60° C. 10 parts of the dyestuff obtainable as described in Example 2 are dissolved in 100 parts of water and added to the dye vat, and dyeing is carried on for 1 hour. Fixing is then brought about by the addition of 5 parts of formic acid to the dye liquor and the treatment is continued for a further 30 minutes. The quantities are calculated on the dry weight of the leather. There is obtained a full greenish black dyeing.

What I claim is:

1. A trisazo dyestuff of the formula

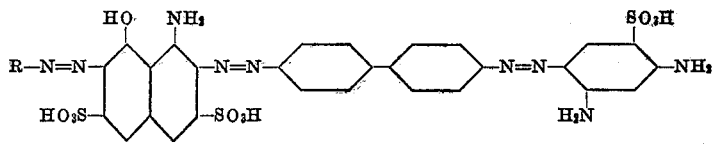

in which R represents an aromatic radical of the benzene series.

2. A trisazo dyestuff of the formula

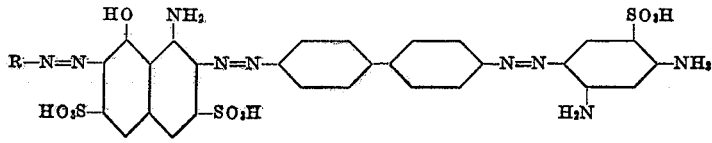

in which R represents a sulfonated aromatic radical of the benzene series.

3. A trisazo dyestuff of the formula

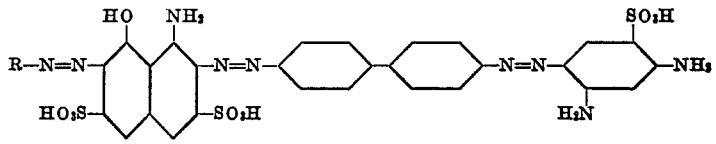

in which R represents an aromatic radical of the benzene series containing a single sulfonic acid group.

4. A trisazo dyestuff of the formula

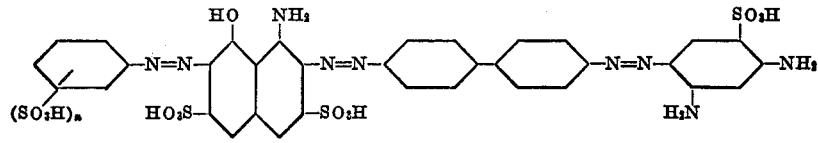

in which $n$ represents a whole number but at the most 2.

5. The trisazo dyestuff of the formula

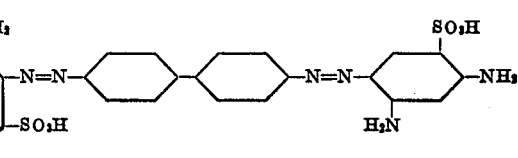

6. The trisazo dyestuff of the formula

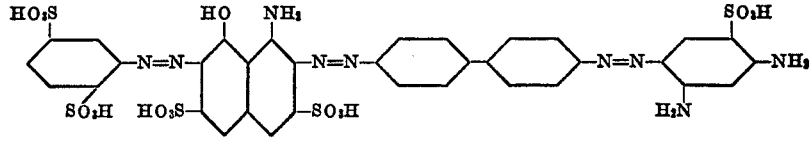

7. The trisazo dyestuff of the formula

8. The trisazo dyestuff of the formula

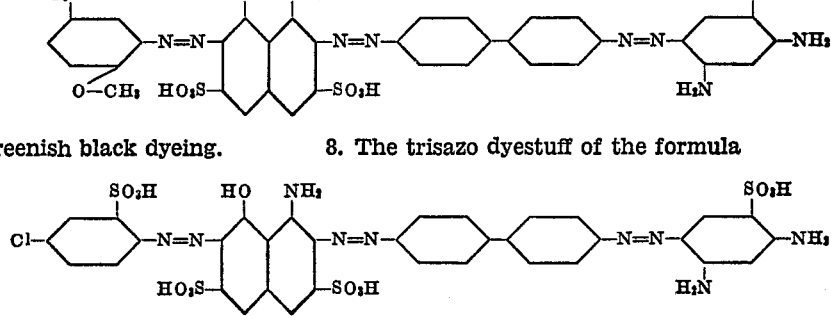

9. The trisazo dyestuff of the formula
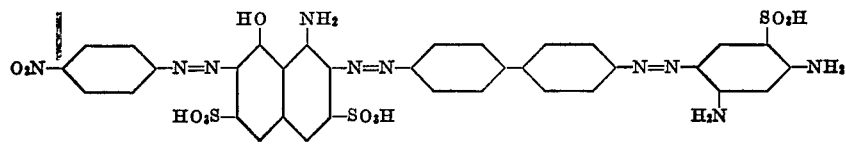
RAYMOND GUNST.
References Cited in the file of this patent
UNITED STATES PATENTS
| Number | Name | Date |
|---|---|---|
| 588,182 | Rosenberg | Aug. 17, 1897 |
| 688,478 | Mueller | Dec. 10, 1901 |
| 1,610,946 | Hitch et al. | Dec. 14, 1926 |
| 2,183,087 | Senn | Dec. 12, 1939 |